US012675742B2

(12) United States Patent
Huerta et al.

(10) Patent No.: US 12,675,742 B2
(45) Date of Patent: Jul. 7, 2026

(54) SYSTEMS AND METHODS FOR ESTIMATING STABILITY OF A DATASET

(71) Applicant: Synchrony Bank, Stamford, CT (US)

(72) Inventors: Juan Manuel Huerta, Stamford, CT (US); Michael Bopp, Stamford, CT (US); Thomas Patrick Prendergast, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 0 days.

(21) Appl. No.: 18/678,189

(22) Filed: May 30, 2024

(65) Prior Publication Data

US 2024/0320561 A1    Sep. 26, 2024

Related U.S. Application Data

(63) Continuation of application No. 18/364,049, filed on Aug. 2, 2023, now abandoned, which is a continuation of application No. 16/828,604, filed on Mar. 24, 2020, now Pat. No. 11,763,195.

(60) Provisional application No. 62/823,499, filed on Mar. 25, 2019.

(51) Int. Cl.
| | |
|---|---|
| *G06N 20/00* | (2019.01) |
| *G06F 16/22* | (2019.01) |
| *G06F 17/18* | (2006.01) |
| *G06F 18/22* | (2023.01) |
| *G06F 18/2411* | (2023.01) |

(52) U.S. Cl.
CPC ......... *G06N 20/00* (2019.01); *G06F 16/2237* (2019.01); *G06F 17/18* (2013.01); *G06F 18/22* (2023.01); *G06F 18/2411* (2023.01); *G06F 2216/03* (2013.01)

(58) Field of Classification Search
CPC ..... G06N 20/00; G06F 16/2237; G06F 17/18; G06F 18/22; G06F 18/2411; G06F 2216/03; G06Q 40/03
USPC ....... 707/600, 603, 734, 748, 749, 754, 758; 706/12, 45
See application file for complete search history.

(56) References Cited

U.S. PATENT DOCUMENTS

| | | | |
|---|---|---|---|
| 6,401,063 B1 | 6/2002 | Hebert et al. | |
| 8,745,074 B1* | 6/2014 | Covell ................ | G06F 16/9535 707/758 |
| 2002/0188558 A1* | 12/2002 | Morimoto .............. | G06Q 40/00 705/39 |
| 2004/0098225 A1 | 5/2004 | Abe et al. | |
| 2006/0085334 A1 | 4/2006 | Murphy | |
| 2012/0290879 A1 | 11/2012 | Shibuya et al. | |
| 2017/0193782 A1 | 7/2017 | Purohit et al. | |
| 2018/0336466 A1* | 11/2018 | Braun ..................... | G06N 3/08 |

(Continued)

OTHER PUBLICATIONS

Office Action mailed Jul. 18, 2022 in U.S. Appl. No. 16/828,604.

(Continued)

*Primary Examiner* — Phong H Nguyen
(74) *Attorney, Agent, or Firm* — Polsinelli PC

(57) ABSTRACT

Disclosed embodiments may provide a framework to measure and leverage the observable attributes that most directly affect the data stability of a customer. In addition, embodiments track the dynamics of the observable components that sustain the data stability of a customer. Embodiments may be used to estimate the stability of a variety of conditions for various contexts, such as the stability of a computing system over time.

21 Claims, 7 Drawing Sheets

(56) References Cited

U.S. PATENT DOCUMENTS

| 2019/0215796 | A1  | 7/2019  | Poosamani et al.     |            |
|--------------|-----|---------|----------------------|------------|
| 2019/0295114 | A1* | 9/2019  | Pavletic ............... | G06Q 30/02 |
| 2019/0332946 | A1  | 10/2019 | Han et al.           |            |
| 2020/0004616 | A1* | 1/2020  | Natsumeda ........... | G06N 3/044 |
| 2020/0019871 | A1  | 1/2020  | Balakrishnan et al.  |            |
| 2020/0076813 | A1* | 3/2020  | Felice-Steele ......... | H04L 63/18 |
| 2020/0151687 | A1* | 5/2020  | Bhasin ............... | G06Q 20/102 |

OTHER PUBLICATIONS

Office Action mailed Nov. 17, 2022 in U.S. Appl. No. 16/828,604.
Notice of Allowance mailed May 5, 2023 in U.S. Appl. No. 16/828,604.
Office Action mailed Feb. 27, 2024 in U.S. Appl. No. 18/364,049.

* cited by examiner

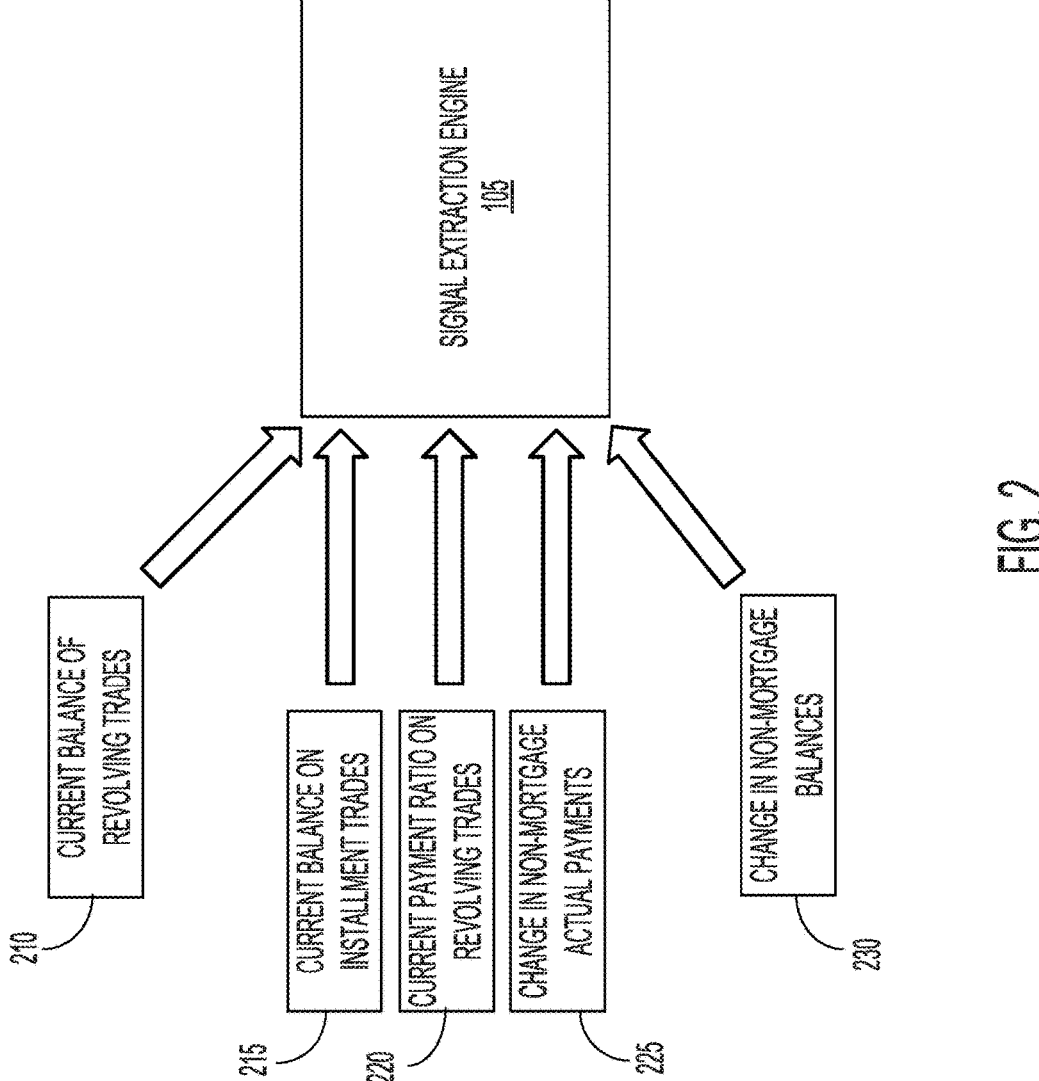
FIG. 2

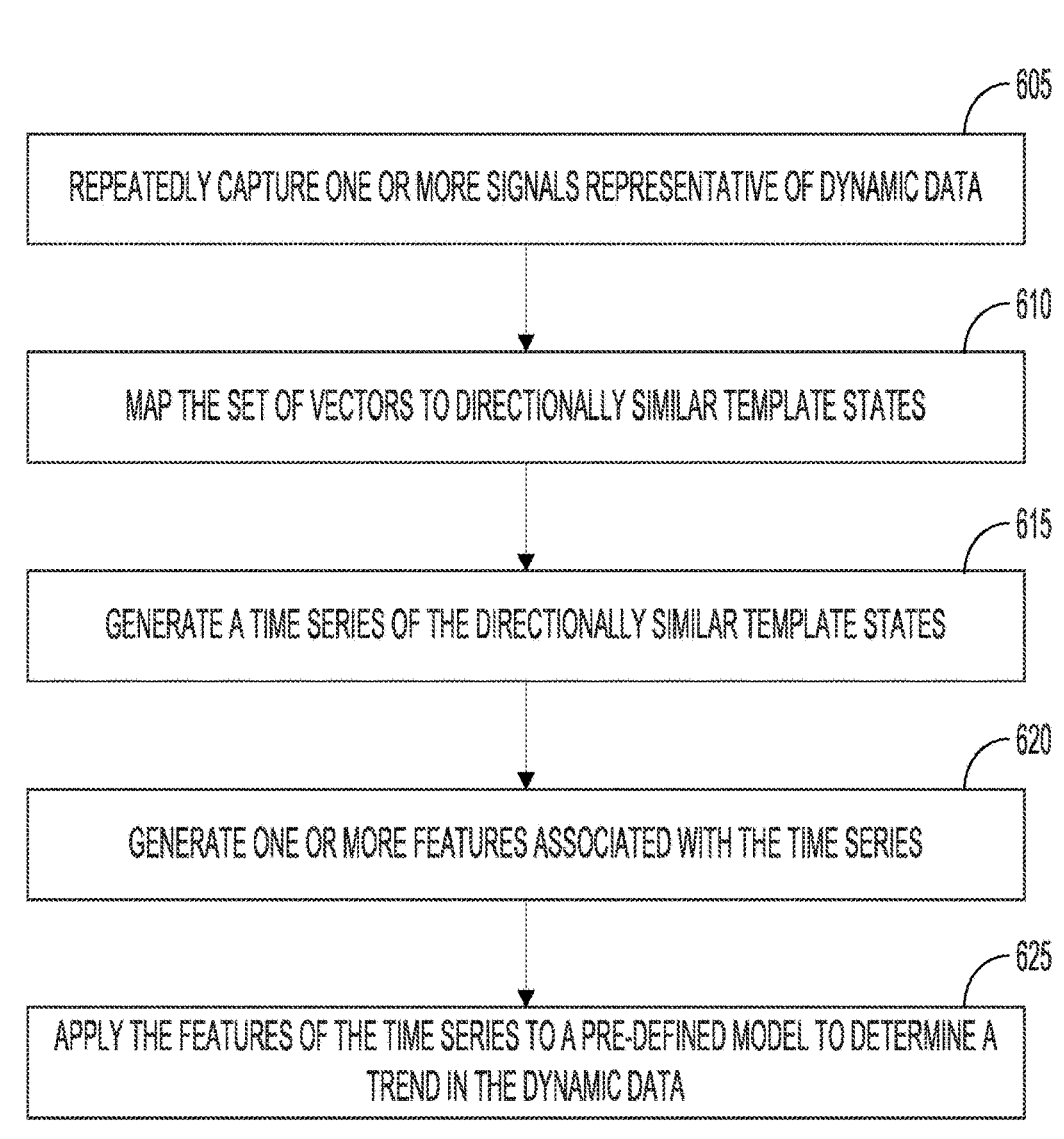

600

605
REPEATEDLY CAPTURE ONE OR MORE SIGNALS REPRESENTATIVE OF DYNAMIC DATA

610
MAP THE SET OF VECTORS TO DIRECTIONALLY SIMILAR TEMPLATE STATES

615
GENERATE A TIME SERIES OF THE DIRECTIONALLY SIMILAR TEMPLATE STATES

620
GENERATE ONE OR MORE FEATURES ASSOCIATED WITH THE TIME SERIES

625
APPLY THE FEATURES OF THE TIME SERIES TO A PRE-DEFINED MODEL TO DETERMINE A TREND IN THE DYNAMIC DATA

FIG. 6

SYSTEMS AND METHODS FOR ESTIMATING STABILITY OF A DATASET

CROSS-REFERENCE TO RELATED APPLICATIONS

The present application is a continuation of U.S. patent application Ser. No. 18/364,049 filed Aug. 2, 2023, which is a continuation of U.S. patent application Ser. No. 16/828, 604, filed Mar. 24, 2020, which claims benefit from U.S. Provisional Patent Application No. 62/823,499, filed Mar. 25, 2019, which are incorporated herein by reference in their entireties.

FIELD

The present disclosure relates generally to estimating stability of data over time for a variety of contexts. In one example, the systems and methods described herein may be used to estimate economic or financial stability of a customer based on observable attributes.

BACKGROUND

Customers often seek to obtain credit from a lending institution for a variety of purposes, such as a purchase a home, a car, or a business. When a decision is made by a lending institution to extend credit to a customer, the creditworthiness of the customer may be assessed using a multitude of scores, rules, signals, and thresholds. These sets of available credit scores and algorithms focus on the probability of repayment if the customer borrows money. These models may be optimized to rank expected outcomes based on the likelihood to repay.

These models may compute the likelihood to repay based on the current state of the credit bureau attributes observed at decision time. Recently, credit bureaus have introduced trended attributes with the purpose of reflecting the change of these attributes through time. However, the focus of these scores is still to predict creditworthiness in the immediate future and not over time. Customers, on the other hand, change through time. The economic and financial stability of the customer also changes through time. These changes may not be reflected in ordinary credit bureau data.

SUMMARY

The systems and methods described herein address these downfalls of typical credit bureau data, as well as other problems. Although events and decisions may be manifested in observable credit data, the dynamics of these attributes through time, as well as the changes and decisions made by the customer, may not be reflected. A customer's personal economy is directly affected by these changes and the financial stability of the customer may be key to the ability of that customer to repay. Thus, while financial stability of the customer is critical, a problem exists in that none of the off-the-shelf scores available explicitly model the components of a customer's personal economy that directly affect the stability of the customer, particularly as this changes over time. Disclosed embodiments address this need and others by providing a framework to measure and leverage the observable attributes that most directly affect the financial stability of the customer from the point of view of cash flow and balance sheet. In addition, embodiments track the dynamics of the observable components that sustain the financial and economic stability of a customer.

According to some embodiments, a computer-implemented method is provided. The method comprises repeatedly capturing one or more signals representative of dynamic data into a vector, creating a set of vectors over time. The method further comprises mapping the set of vectors to directionally similar template states. Mapping includes performing unsupervised clustering of the set of vectors. The method further comprises generating a time series of the directionally similar template states using the set of vectors over time. The method further comprises generating features of the time series based on a sequence of the directionally similar template states in the time series. Generating features includes running the time series through a classification algorithm. The method further comprises applying the features of the time series to a pre-defined model to determine a trend in in the dynamic data.

According to some embodiments, a computer-program product is provided. The computer-program product is tangibly embodied in a non-transitory machine-readable storage medium, including instructions that, when executed by one or more processors, cause the one or more processors to perform the steps of the above method.

According to some embodiments, a system is provided. The system comprises one or more processors, and one or more non-transitory machine-readable storage media containing instructions that, when executed on the one or more processors, cause the one or more processors to perform operations including the steps of the above method.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 2 depicts a chart illustrating the inputs to the signal extraction engine according to some embodiments;

FIG. 6 depicts a flowchart illustrating a method for estimating stability of a dataset according to some embodiments.

Figure 1:
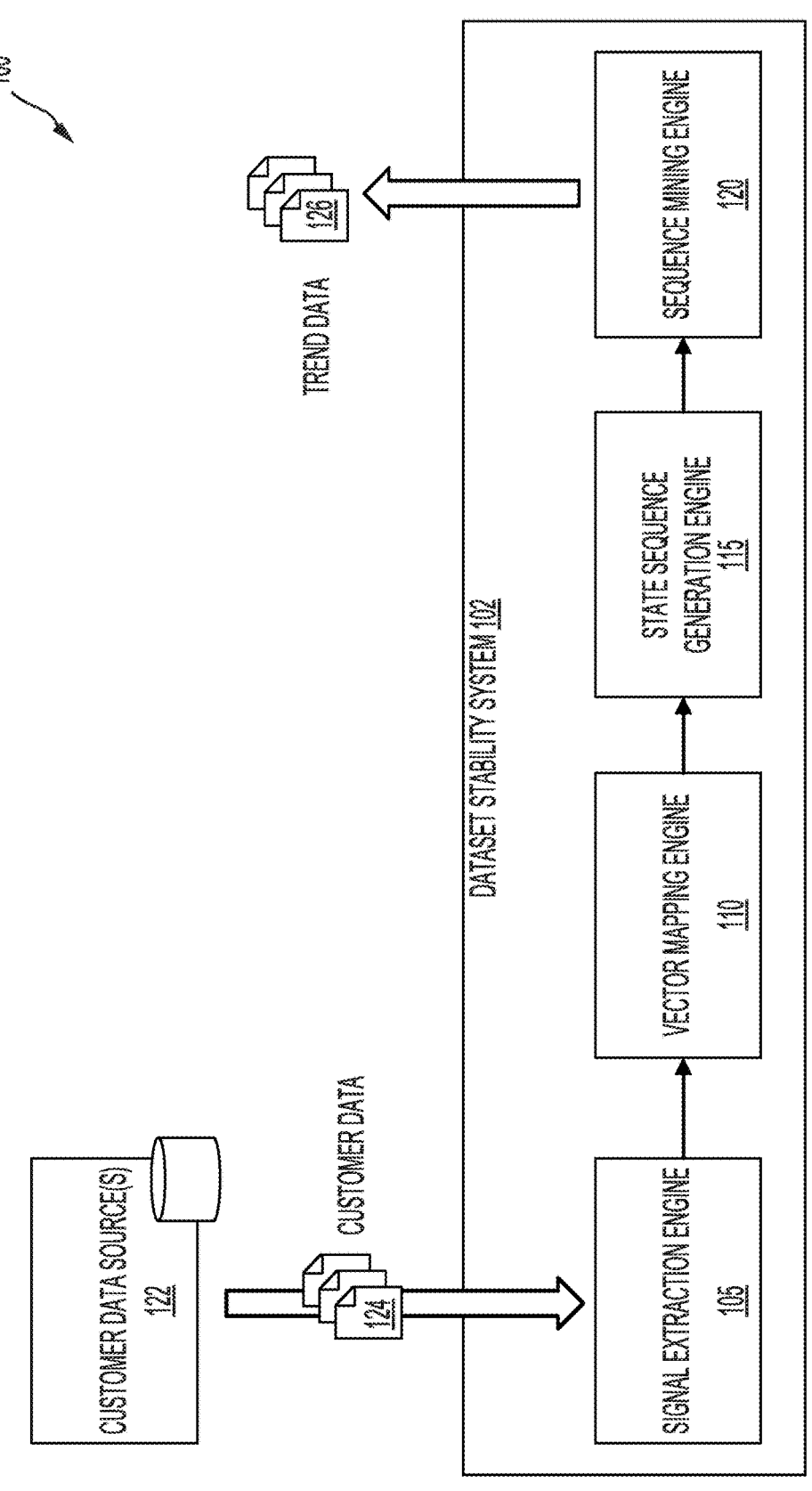
FIG. 1 depicts a high-level system diagram for estimating stability of a dataset according to some embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Systems and methods described herein may estimate stability of a dynamic dataset over time. Some embodiments capture dynamic data in the form of a set of vectors. The vectors may be mapped to directionally similar template states. A dictionary of template states may be used to identify which template state is closest to the vector. The identified template states may be organized in a time series corresponding to when the underlying dynamic data was captured. Features of the time series may be generated to identify stable states and transitory states. The sequence of these states may be run through a classification algorithm to identify trends in the underlying dynamic data.

These trends may be used for a variety of purposes. In one example, financial data of a customer, including balances and payments, may be used as input to determine the creditworthiness of the customer over time. In another example, economic data of a region, financial index, business, or the like may be used as input to determine the economic stability of that entity over time. In still another example, performance data related to computing systems or electronics may be collected over time and analyzed to determine trends in stability and consistency of the computing system over time. This data may be useful in maximizing performance of the computing system over a long period of time by observing changes and trends in data handling that can be addressed.

The systems and methods described herein can be used in any context where there is an inflow and an outflow quantity of a resource, as well as the ability to borrow resources externally to balance the deficit. Examples of this are in workforce in an organization (wherein the labor deficit can be covered by temporary workers), fungible commodity resources for which there is supply, demand, and reserves (e.g., oil, gas, gold, money, etc.), systems that can allocate reserves in a particular way and address real-time supply and demand (e.g., electricity in the grid when the grid can keep and manage reservoirs of energy in the form of batteries, hydrogen cells, etc.).

FIG. 1 depicts a high-level system diagram 100 for estimating stability of a dataset according to some embodiments. A dataset stability system 102, as illustrated in FIG. 1, includes four components: a signal extraction engine 105, a vector mapping engine 110, a state sequence generation engine 115, and a sequence mining engine 120. Although shown and illustrated as having four components, it is contemplated that a greater or fewer number of components may be integrated into the dataset stability system 102 to perform the steps described herein. Further, it is contemplated that some of the steps performed by separate components of the dataset stability system 102 can be combined and performed by a single component, or vice versa.

The signal extraction engine 105 may, in conjunction with a processor (not shown), capture signals representative of dynamic data into a vector. For instance, the signal extraction engine 105 may obtain, from one or more customer data sources 122, customer data 124 that may be representative of dynamic data for one or more customers. The one or more customer data sources 122 may include public repositories of customer information (e.g., demographic customer information, statistical data related to customers in a geographic region, etc.), as well as sources with proprietary customer data (e.g., credit reporting agencies, billing services, medical services, etc.). For instance, the customer data 124 may include customer balances, payment ratios, changes in customer payments and transactions over time, changes in customer balances over time, and the like. In the financial context, signals that influence the balance sheet and cash flow dynamics may be computed and extrapolated onto a vector comprising the various values. Exemplary values that may be used to build the vector are discussed herein with respect to FIG. 2. The signal extraction engine 105 may be implemented as a standalone computer system of the dataset stability system 102, as an application or other software implemented on to one or more computer systems of the dataset stability system 102, and the like.

The vector mapping engine 110 may, in conjunction with a processor (not shown), map the vectors generated by the signal extraction engine 105 to directionally similar template states. In some embodiments, the vectors may be mapped to the directionally similar template states by performing unsupervised clustering. For example, a dictionary of template states may be created and the closest template state to the vector may be selected. The dictionary of template states may be created by collecting a large representative amount of dynamic data, computing vectors in five dimensions, performing unsupervised clustering, and selecting the most representative template states. For instance, the large representative amount of dynamic data may include training data that includes a set of input vectors without any corresponding target values. A machine learning algorithm that relies on unsupervised learning may be implemented by the vector mapping engine 110 to identify different clusters from the training data that may be used to define the dictionary of template states. Each cluster may correspond to a different state, whereby each state may correspond to the stability and polarity of the members of the cluster in terms of expected future stability.

In an embodiment, the vector mapping engine 110 utilizes a cluster centroid algorithm to generate the set of clusters, or states, for the dictionary of template states. This cluster centroid algorithm may relies on the k-Means clustering algorithm to perform clustering of the training data to generate the dictionary of template states. The k-Means algorithm may be used to store k centroids, which may be used to define a set of clusters. A data point is within a particular cluster if the data point is closer the centroid of that cluster than any other centroid. A system executing the cluster centroid algorithm may utilize the k-Means algorithm to cluster the training data into an N number of clusters. The system may determine the centroid of each of the N clusters and the data points of these clusters are replaced by the N number of cluster centroids. These cluster centroids may be defined as the different states for the dictionary of template states. It should be noted that different clustering algorithms may be implemented by the vector mapping engine 110, such as mean-shift clustering algorithms, Density-Based Spatial Clustering of Applications with Noise (DBSCAN), Expectation-Maximization (EM) Clustering using Gaussian Mixture Models (GMM), agglomerative hierarchical clustering, and the like.

In an embodiment, the clustering of obtained data is carried out using directional similarity to determine which cluster each data point of the obtained data corresponds to. For instance, the vector mapping engine 110 may determine a directional similarity measure for each vector against the various clusters of the dictionary of states using cosine similarity (e.g., normalized dot product between two vectors), Pearson's correlation, and the like. These vectors may be mapped to a discrete value by finding the closest template in the dictionary of states. The distance between the vector and the closest template state may be a normalized Euclidean distance (e.g., the ordinary distance between the vector and the centroid of the nearest cluster). The vector mapping engine 110 may be implemented as a standalone computer system of the dataset stability system 102, as an application or other software implemented on to one or more computer systems of the dataset stability system 102, and the like.

The state sequence generation engine 115 may, in conjunction with a processor (not shown), generate a time series of template states over a period of time or over history. In other words, the state sequence generation engine 115 may create a time ordered sequence of the template states. Once the time series has been generated, the time series can be analyzed to identify one or more features. Features may be identified based on the sequence of the template states and the strings of template states created. For example, three stable states followed by one transitory state may be associated with a negative feature, because the most recent state is unstable.

The sequence mining engine 120 may, in conjunction with a processor (not shown), leverage the time series of template states in classification algorithms through data mining in some embodiments. In some embodiments, other sequence-based statistical methods may be used. The output of the sequence mining engine 120 may be used to determine trend data 126 from the dynamic data used to generate the vectors, such as stability or instability, and to draw conclusions based on the trend data 126. In some embodiments, the trend data 126 may be reflected as a score or grade representing the stability of the dynamic data. In an embodiment, the different trends correspond to characteristics determined via historical analysis of different trends over time for various customers and other entities. The sequence mining engine 120 may, thus, identify a corresponding trend based on an analysis of the time series data compared to the various historical analysis of different trends observed over time. These historical analyses may be obtained from any suitable authoritative source (e.g., government agencies, financial regulation agencies, credit agencies, etc.).

FIG. 2 depicts a chart 200 illustrating the inputs to the signal extraction engine 105 according to some embodiments. The inputs illustrated in FIG. 2 are exemplary and apply to some embodiments in which financial stability of a person or organization is analyzed. As shown in FIG. 2, some exemplary inputs include current balance of revolving trades 210, current balance on installment trades 215, current payment ratio on revolving trades 220, change in non-mortgage actual payments 225, and change in non-mortgage balances 230. Although shown and described as having five inputs, it is contemplated that a greater or less number of inputs may be fed into the signal extraction engine 105. Further, it is contemplated that different inputs may be utilized in different contexts. It should be noted that while financial inputs are illustrated and used throughout the present disclosure for the purpose of illustration, other inputs may be utilized by the dataset stability system to determine the data-specific stability of a person, organization, or other entity. For instance, inputs may include data that may be used to determine, among other things, the stability of a person's medical health, the stability of a person's driving history for determining insurability, and the like. Further, the inputs may include data that is not necessarily associated with a person or organization. For instance, inputs may include data associated with a geographic region, other persons and/or organizations, and the like that may be used to determine a person's or organization's stability relative to the geographic region, other persons and/or organizations, etc.

The various inputs illustrated in FIG. 2 may be obtained from one or more data sources. For instance, a subset of the one or more inputs may be obtained from a public repository of customer data, such as anonymous customer data corresponding to customers in a particular geographic area, to customers of a retailer or set of retailers, customer demographics, and the like. A subset of the one or more inputs may also be obtained from other sources, such as credit reporting agencies, billing services, medical services, or other sources that may maintain proprietary or sensitive data of a person or organization.

The various inputs may be obtained synchronously or asynchronously. For instance, in an embodiment, the signal extraction engine 105 queries each of the available data sources at particular time intervals to obtain the various inputs that may be used to determine the data-specific stability of a person or organization. Alternatively, the signal extraction engine 105 may obtain the various inputs as these inputs are generated by corresponding data sources. For instance, the various inputs may be updated by the various data sources at different times based on personal or organizational actions that impact each of the various inputs. For example, the current balance of revolving trades 210 may change at a different time compared to changes in non-mortgage balances 230 and changes in non-mortgage actual payments 225. Further, each of the inputs may be updated at different time intervals by the corresponding data source (e.g., a balance may be updated bi-weekly while changes in payments may be updated monthly, etc.). Thus, the various inputs may be received by the signal extraction engine 105 at different time intervals or in real-time depending on how the various data sources push the inputs to the signal extraction engine 105.

In an embodiment, the signal extraction engine 105 processes the various inputs as they are received by the signal extraction engine 105, as described herein. Alternatively, the signal extraction engine 105 may process the various inputs at particular time intervals, whereby inputs obtained between consecutive time periods are processed regardless of whether all acceptable types of inputs are obtained between the consecutive time periods or not. In another embodiment, the signal extraction engine 105 processes the various inputs once each of the inputs has been obtained from the various data sources. For instance, the signal extraction engine 105 may evaluate each of the inputs obtained from each of the data sources to determine whether a change to the input has occurred from a time at which the signal extraction engine 105 previous processed an earlier version of the input. Once the signal extraction engine 105 has determined that each of the inputs includes new data, the signal extraction engine 105 may process the inputs as described herein.

Current balance of revolving trades 210 may be a measure of credit being used on a revolving account, such as a credit card or a home equity line of credit. Current balance on installment trades 215 may be a measure of credit being used that is being paid back over time on a fixed payment per month, for example, without additional credit becoming available. Exemplary installment trades include student loans, car loans, mortgages, and the like. Current payment ratio on revolving trades 220 reflects a ratio of how many times just the minimum payment is being made on a revolving trade. Change in non-mortgage actual payments 225 looks at changes in payments (i.e., increases or decreases) to detect a trend. Change in non-mortgage balances 230 looks at changes in balances (i.e., increases or decreases) to detect a trend. These inputs may be reflective of how stable or unstable a customer is. As noted above, each of these inputs may be obtained from various data sources or from a singular data source.

Figure 3:
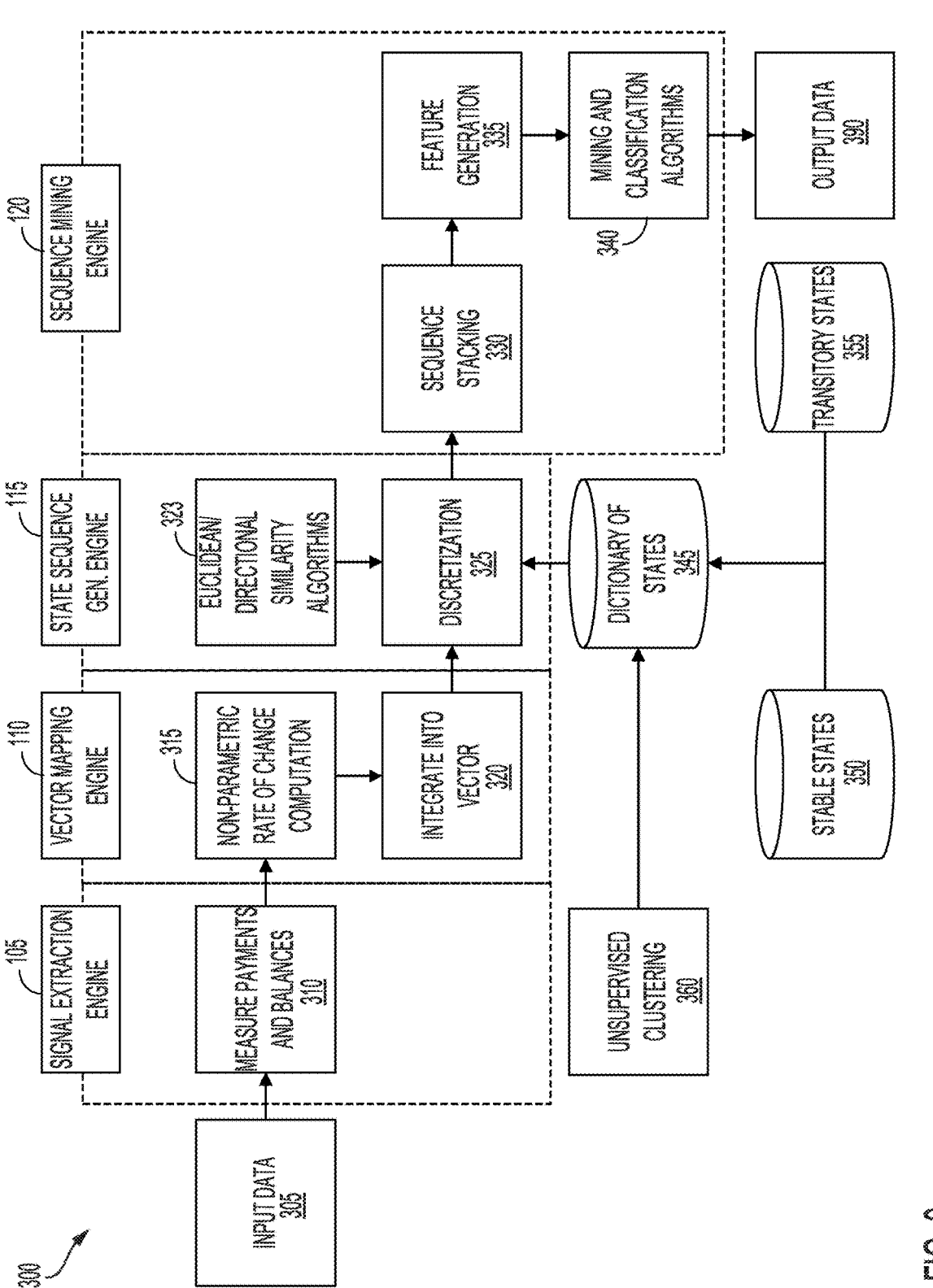
FIG. 3 depicts a detailed system diagram for estimating stability of a dataset according to some embodiments.

FIG. 3 depicts a detailed system diagram 300 for estimating stability of a dataset according to some embodiments. Input data 305 may be fed into the signal extraction engine 105. The input data 305 may be, for example, the input data described with respect to FIG. 2. In some embodiments, the input data 305 may include bureau data. As noted above, the input data 305 may be obtained from various data sources, such as a credit bureau, credit reporting agencies, billing services, medical services, or other sources that may maintain proprietary or sensitive data of a person or organization. The input data 305 may also include publicly available data from one or more public repositories of data (e.g., census data, demographic data, statistical data for a geographic region, etc.).

The signal extraction engine 105 may measure, as an illustrative example, payments and balances 310 from the input data 305. In some embodiments, the balances may be broken down into revolving balances and installment balances. In some embodiments, the payments may exclude the mortgage payments. In some embodiments, the payments and balances may include the average rate of change in the balances and in the payments in a period of time. The rates of change may be computed using robust non-parametric algorithms or robust statistical algorithms. The signal extraction engine 105 may measure these payments and balances in response to obtaining the input data 305 from the various data sources in real-time. Alternatively, the signal extraction engine 105 may query these data sources at particular time intervals to obtain the input data 305 that may be used to measure the payments and balances. In some instances, the signal extraction engine 105 may measure the payments and balances at particular time intervals using the input data 305 obtained between consecutive time intervals. In other instances, the signal extraction engine 105 may process the input data 305 in response to a triggering event, such as a change in regulatory standards that may impact a customer's creditworthiness, an event that may impact the creditworthiness of various customers in a particular geographic region, and the like.

The vector mapping engine 110 may compute the non-parametric rate of change 315 and integrate the data into a vector 320. The state sequence generation engine 115 may feed the vector 320 and a set of Euclidean and directional similarity algorithms 323 into a discretization engine 325 along with a dictionary of states 345. The dictionary of states may be made up of stable states 350 and transitory states 355. Unsupervised clustering 360 may be performed to categorize all states into the dictionary of states 345. The states in the dictionary of states 345 may be grouped, or clustered, by their stability and polarity in terms of expected future stability. The groupings may be carried out using directional similarity. In some embodiments, directional similarity may be carried out using cosine similarity. The discretization engine 325 may map the vectors to a discrete value by finding the closest template in the dictionary of states 345. The distance between the vector and the closest template state may be a normalized Euclidean distance.

The dictionary of states 345 may be created by collecting a large representative amount of dynamic data, computing vectors in five dimensions, performing unsupervised clustering, and selecting the most representative template states. For instance, the large representative amount of dynamic data may include training data that includes a set of input vectors without any corresponding target values. A machine learning algorithm that relies on unsupervised learning or clustering may be implemented to identify different clusters from the training data that may be used to define the dictionary of states 345. Each cluster may correspond to a different state, whereby each state may correspond to the stability and polarity of the members of the cluster in terms of expected future stability.

The output of the discretization engine 325 may be used as input into sequence stacking 330, which may be performed by the sequence mining engine 120. In sequence stacking 330, sequences of states may be computed from historical data. For instance, the sequence mining engine 120, via sequence stacking 330, may aggregate a series of states identified over time from the discretization engine 325. The sequence mining engine 120 may define a time period for a series of states that is to define a particular sequence of states. For example, the sequence mining engine 120 may aggregate a set of number of consecutive states into a sequence of states. Alternatively, the sequence mining engine 120 may aggregate any number of states obtained over a time period to generate the sequence of states. Once a sequence or time series of states is obtained, the time series may be fed into feature generation 335. In some embodiments, the time series may be introduced into a machine learning algorithm. After the features are generated and identified, the features may be passed into mining and classification algorithms 340, resulting in output data 390. Mining and classification algorithms 340 may mine the sequence of states to find the most unique, salient, or predictive characteristics. Output data 390 may be reflective of trends in the input data 305, such as, for example, a score or grade of stability in the input data 305.

In an embodiment, the mining and classification algorithms 340 may determine that a sequence of states correspond to one or more characteristics based on a historical analysis of different trends over time for various customers and other entities. The mining and classification algorithms 340 may, thus, identify a corresponding trend based on an analysis of the time series data compared to the various historical analysis of different trends observed over time. These historical analyses may be obtained from any suitable authoritative source (e.g., government agencies, financial regulation agencies, credit agencies, etc.). The output data 390 may, thus, also be reflective of these characteristics for the customer or organization.

Figure 4:
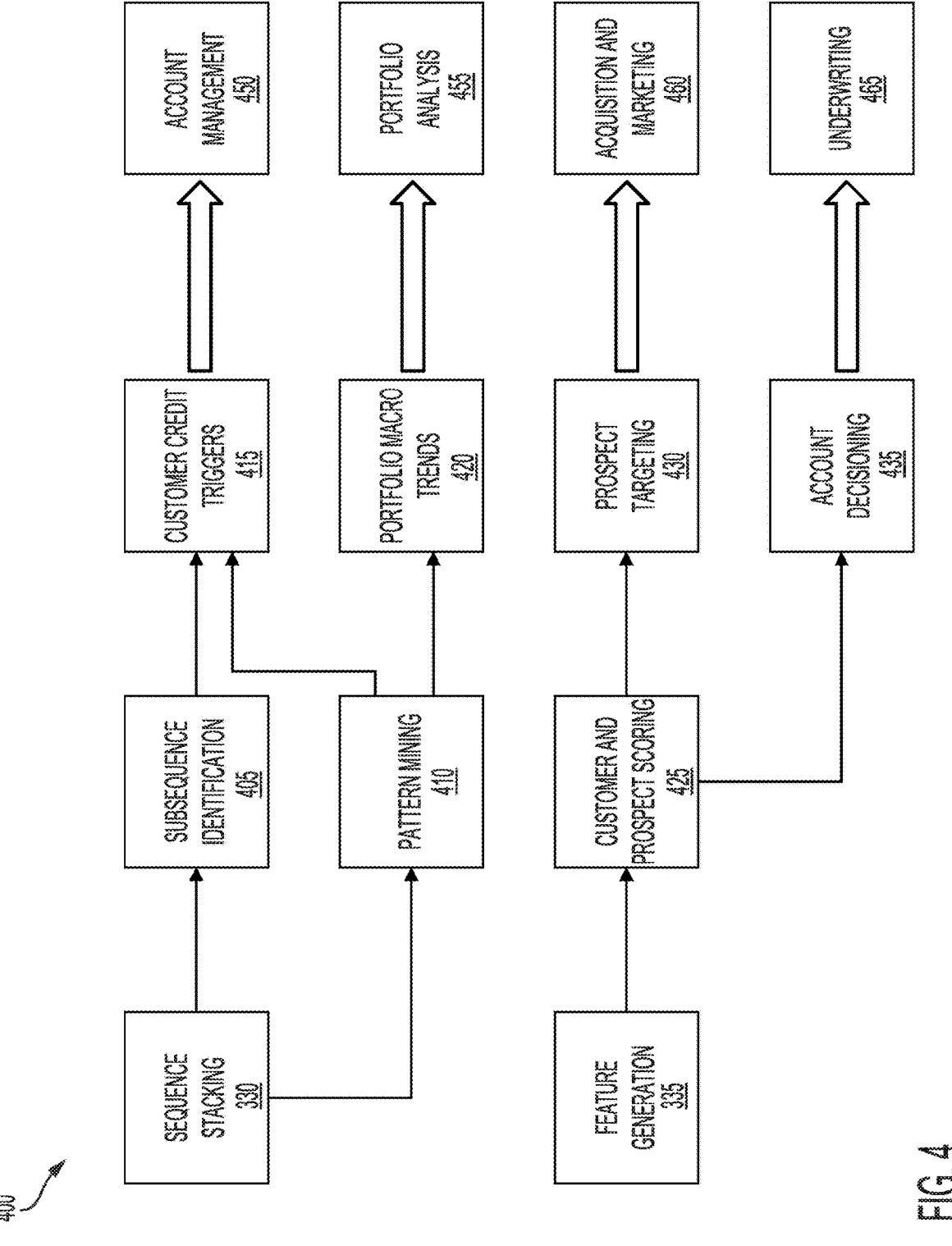
FIG. 4 depicts a flow diagram illustrating the outputs from the system and possible applications according to some embodiments.

FIG. 4 depicts a flow diagram 400 illustrating the outputs from the dataset stability system and possible applications for these outputs according to some embodiments. As shown in FIG. 4, sequence stacking 330 may be used for subsequence identification 405 and pattern mining 410. Subsequence identification 405 and pattern mining 410 may be used to identify customer credit triggers 415. This is a possible application of the system described herein to account management 450. For instance, based on the various subsequences and patterns identified by the system, the system may identify one or more customer credit triggers that may be used to determine certain characteristics of a customer. As an example, a customer credit trigger may serve as a signal that the customer is likely preparing for a future transaction or is open to obtaining a new line of credit. This may cause the system to approach the customer with an offer for a new line of credit or other products that the customer may be interested in based on these identified triggers.

Alternatively or additionally, pattern mining 410 may be used to identify portfolio macro trends. This is a possible application of the dataset stability system described herein to portfolio analysis 455. For instance, based on a customer's sequence of states over a period of time, the system may identify a set of trends corresponding to customer management of its portfolio based on one or more external factors (e.g., market volatility, global recessions, bear or bull markets, etc.). Further, the system may identify one or more characteristics of the customer with regard to how the customer manages its portfolio over time. These portfolio macro trends 420 may be used to analyze the customer's portfolio and determine how best to manage the customer's portfolio. This may include offering the customer with various options to automatically manage the customer's portfolio subject to preferences determined based on the portfolio macro trends 420. Additionally, the portfolio analysis 455 may result in identifying possible changes to the customer's portfolio based on the customer's portfolio macro trends 420 and/or identify avenues for improvement of the customer's portfolio that may run counter to a customer's usual trends for the management of its portfolio.

Feature generation 335 may be used for customer and prospect scoring 425. Customer and prospect scoring 425 may be used for prospect targeting 430. This is a possible application of the system described herein to acquisition and marketing 460. For instance, if the system determines that, based on one or more customer features, that the customer is a good prospect for one or more products or services, the customer may be approached with offers for said products or services. As an example, if based on the various features for a customer the system determines that the customer is experiencing sudden credit issues, the system may turn to acquisition and marketing 460 to provide credit consolidation services, balance transfer services, and the like.

Alternatively or additionally, customer and prospect scoring 425 may be used for account decisioning 435. This is a possible application of the system described herein to underwriting 465. For instance, based on the customer and prospect scoring 425, the system may determine the possible risk in providing credit or otherwise provide one or more lending services to a customer. This may be of importance in determining whether to approve a customer's request for a line of credit, for a loan, or other financial service. The customer and prospect scoring 425 may serve as an addition or alternative to traditional customer credit scoring, which may not take into account the volatility (or lack thereof) of the various customer states over time.

Figure 5:
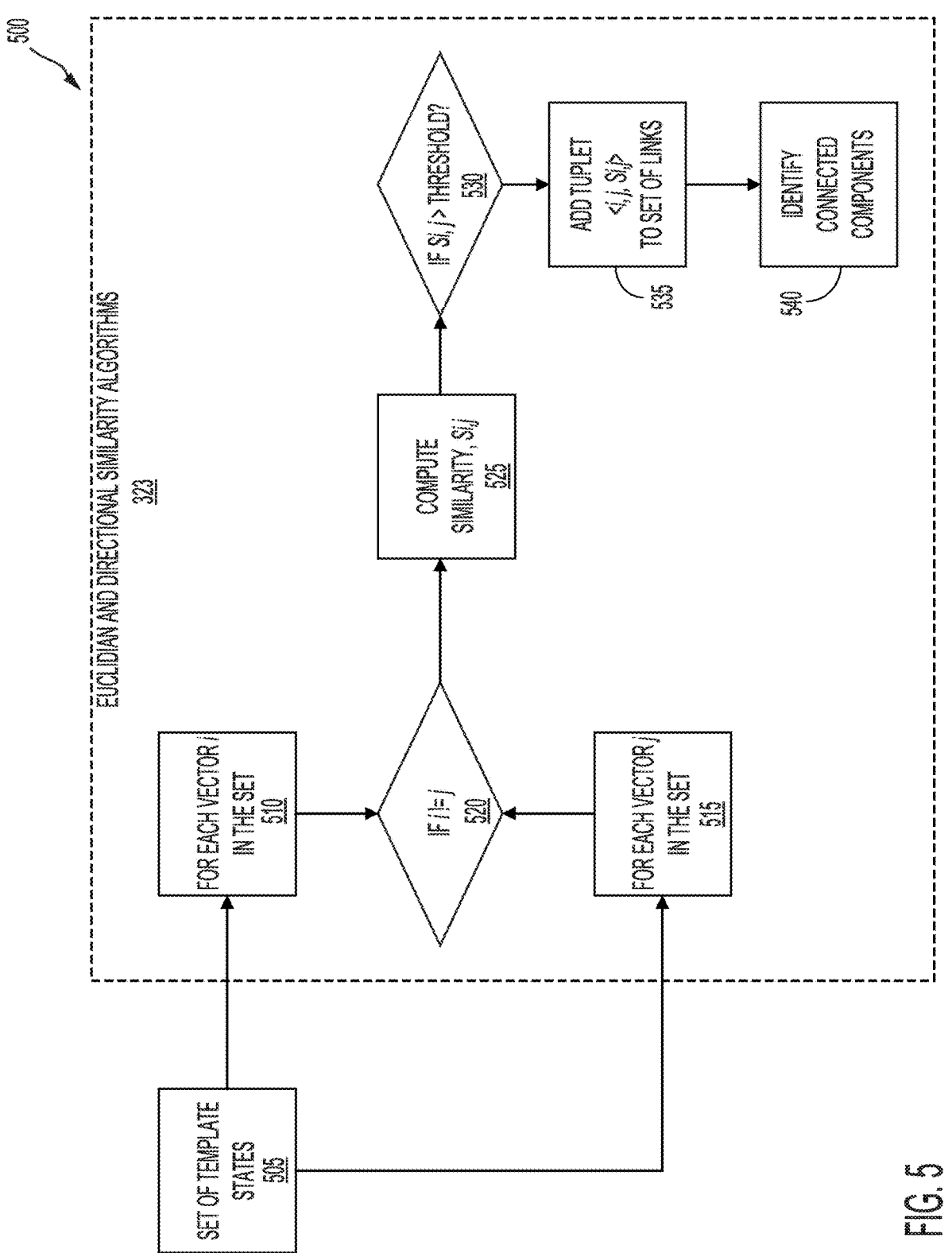
FIG. 5 depicts a logic diagram illustrating how the Euclidean and directional similarity algorithms are applied to a set of template states according to some embodiments.

FIG. 5 depicts a logic diagram 500 illustrating how the Euclidean and directional similarity algorithms 323 are applied to a set of template states 505 according to some embodiments. For each vector, i, in the set of template states 505, and for each vector, j, in the set of template states 505, if i is not equal to j (e.g., if i !=j 520), the similarity Si,j may be computed 525. For instance, using the Euclidean and directional similarity algorithms 323, the state sequence generation engine described above may utilize cosine similarity (e.g., the cosine of the angle between the vectors i and j to determine whether the vectors are directionally similar). Using cosine similarity, the similarity score, Si,j, may vary between −1 (e.g., vectors are diametrically opposed) to +1 (e.g., vectors have same orientation), whereby a value of 0 denotes decorrelation between the two vectors.

If Si,j, the similarity score for the vectors i and j, is greater than a threshold 530, a tuplet <i, j, Si,j> may be added to a set of links 535. The threshold may be determined based on the direction of existing vectors corresponding to the centroids of different clusters in the dictionary of states. Further, the threshold may be determined based on historical analysis regarding predictive qualities of the dictionary of states with regard to previously classified vectors. Based on the set of links, connected components may be identified 540.

FIG. 6 depicts a flowchart 600 illustrating a method for estimating stability of a dataset according to some embodiments. At step 605, one or more signals representative of dynamic data are repeatedly captured. The one or more signals may be obtained from one or more data sources. For instance, the one or more signals may be obtained from one or more public repositories of data (e.g., census data, demographic data, statistical data for a geographic region, etc.). Additionally, the one or more signals may be obtained from one or more sources that maintain proprietary or sensitive information of persons and/or organizations (e.g., credit reporting agencies, billing services, medical services, etc.). For instance, the one or more signals may include customer balances, payment ratios, changes in customer payments and transactions over time, changes in customer balances over time, and the like.

The one or more signals captured by the dataset stability system may be used to generate a set of vectors that may be used to determine the stability (or lack thereof) of a customer (e.g., person or organization). For instance, captured signals, over time, may result in a set of vectors. In some embodiments, the dynamic data may include a rate of change in payments and balances over time. In some embodiments, the rate of change is computed using a robust non-parametric algorithm or a robust statistical algorithm.

At step 610, the set of vectors is mapped to directionally similar template states. Mapping includes performing unsupervised clustering of the set of vectors in some embodiments. In an embodiment, to generate a dictionary of template states that can be used for mapping the set of vectors to directionally similar template states, a representative amount of dynamic data may be obtained that includes training data. The training data may include a set of input vectors without any corresponding target values. A machine learning algorithm that relies on unsupervised learning may be implemented by the dataset stability system to identify different clusters from the training data that may be used to define the dictionary of template states. Each cluster may correspond to a different state, whereby each state may correspond to the stability and polarity of the members of the cluster in terms of expected future stability.

In an embodiment, the set of vectors can be mapped to directionally similar template states according to other methods, including supervised clustering. For instance, the dataset stability system may utilize a training dataset corresponding to one or more known customer characteristics, features, and or trends as input to a machine learning model to determine whether the machine learning model is producing accurate classification of the training dataset as corresponding to the known customer characteristics, features, and or trends. If the machine learning model produces an output that does not correspond to the known customer characteristics, features, and or trends, the dataset stability system may revise the machine learning model by updating one or more model coefficients and re-inputting the training dataset through the updated machine learning model. This iterative process may continue until the machine learning model is capable of producing expected outputs from the training dataset. In some embodiments, as the machine learning model is used to generate features and trends, these may be evaluated by end users (e.g., organizations relying on features and trends to support customers and other entities, etc.), which may provide feedback to the dataset stability system. Based on this feedback, the dataset stability system may update the model to produce more accurate results.

In some embodiments, the set of vectors is mapped to directionally similar template states by computing a distance between the set of vectors and the directionally similar template states. In some embodiments, the distance is a normalized Euclidean distance. In some embodiments, the set of vectors are mapped to directionally similar template states using cosine similarity. For instance, the clustering of obtained data may be carried out using directional similarity to determine which cluster each data point of the obtained data corresponds to. The dataset stability system may determine a directional similarity measure for each vector against the various clusters of the dictionary of states using cosine similarity, Pearson's correlation, and the like. These vectors may be mapped to a discrete value by finding the closest template state in the dictionary of states. The distance between the vector and the closest template state may be a normalized Euclidean distance (e.g., the ordinary distance between the vector and the centroid of the nearest cluster).

At step 615, a time series of the directionally similar template states is generated. The time series is generated using the set of vectors over time. For instance, the dataset stability system may generate, for a particular set of data for a customer or organization and for a particular period of time, a time series of the set of vectors determined for the customer or organization based on the signals obtained from the various sources. The time series may arrange the template states into a series according to when the underlying dynamic data was generated. Further, the time series may be illustrative of any changes (or lack thereof) of the centroids of the clusters that denote each of the different template states.

At step 620, one or more features associated with the time series is generated. A feature is generated using a sequence corresponding to one or more directionally similar template states in the time series. Generating features includes running the time series through a classification algorithm. The classification algorithm may include a logistic regression algorithm, random forest models, Naïve Bayes models, linear regression models, decision tree models, K-Means clustering models, k-Nearest Neighbors (kNN) models, support-vector machine (SVM) models, gradient boosting machine models, and the like. The classification algorithm may associate a particular sequence to a classification (e.g., feature) of a set of classifications. While a sequence may not be a direct match for a particular classification, the classification algorithm may utilize a similarity measure to identify the closest classification that may correspond to the sequence. In some embodiments, generating features further includes performing data mining on the time series.

At step 625, the features of the time series are applied to a pre-defined model to determine a trend in the dynamic data. The pre-defined model may be a machine learning model configured to use the features as input to identify one or more trends in the dynamic data. The machine learning model may be trained using a training dataset with known trends that may serve as a ground-truth for the model. If the model produces a set of trends that do not correspond to the ground-truth, the dataset similarity system may update the model. Once the model has been trained using the training dataset, the dataset stability system may implement the model for determining trends in obtained dynamic data. It should be noted that the pre-defined model may be generated and trained using supervised or unsupervised learning techniques.

The trend may correspond to a score or grade reflective of stability in some embodiments. In some embodiments, the method may further include introducing the set of vectors into a machine learning algorithm, such as the machine learning algorithms described above, to determine the trend or set of trends that may serve as an indication of the stability (or lack thereof) of the obtained signals over time. These trends may be used to determine how best to service a customer or organization, such as described above in connection with FIG. 4.

Figure 7:
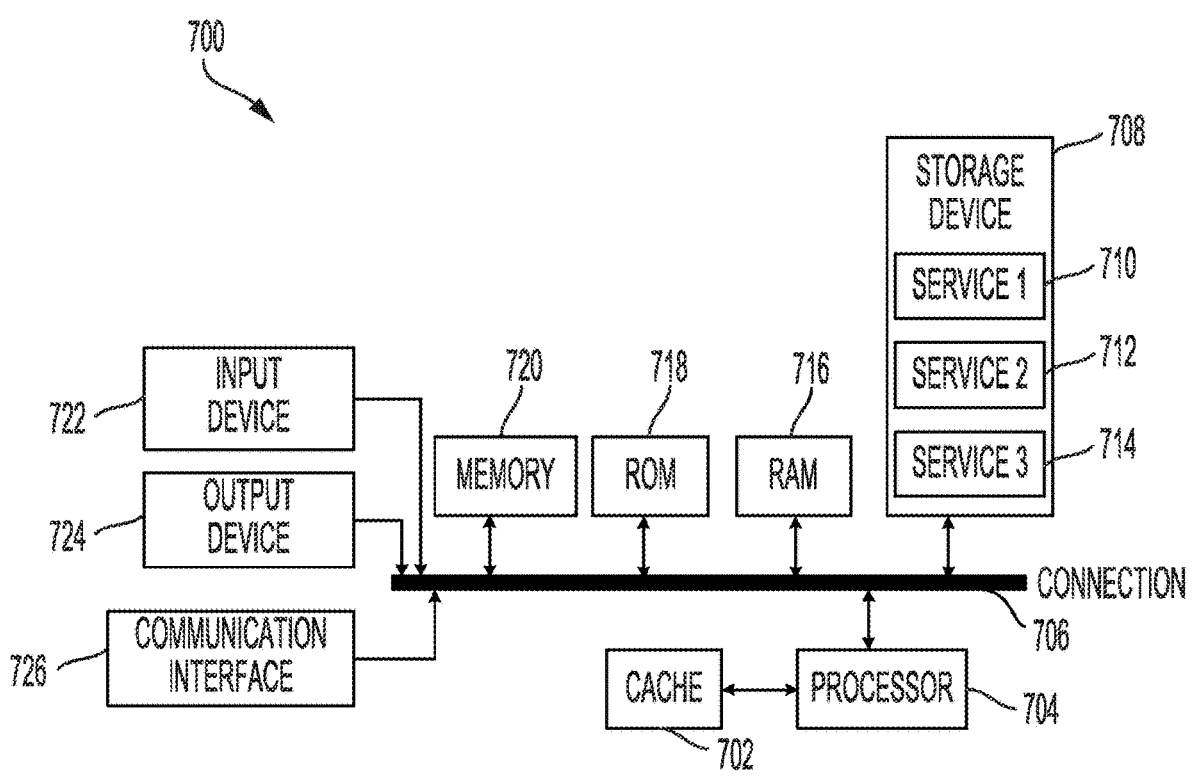
FIG. 7 shows a computing system architecture including various components in electrical communication with each other using a connection in accordance with various embodiments.

FIG. 7 illustrates a computing system architecture 700 including various components in electrical communication with each other using a connection 706, such as a bus, in accordance with some implementations. Example system architecture 700 includes a processing unit (CPU or processor) 704 and a system connection 706 that couples various system components including the system memory 720, such as ROM 718 and RAM 716, to the processor 704. The system architecture 700 can include a cache 702 of high-speed memory connected directly with, in close proximity to, or integrated as part of the processor 704. The system architecture 700 can copy data from the memory 720 and/or the storage device 708 to the cache 702 for quick access by the processor 704. In this way, the cache can provide a performance boost that avoids processor 704 delays while waiting for data. These and other modules can control or be configured to control the processor 704 to perform various actions.

Other system memory 720 may be available for use as well. The memory 720 can include multiple different types of memory with different performance characteristics. The processor 704 can include any general purpose processor and a hardware or software service, such as service 1 710, service 2 712, and service 3 714 stored in storage device 708, configured to control the processor 704 as well as a special-purpose processor where software instructions are incorporated into the actual processor design. The processor 704 may be a completely self-contained computing system, containing multiple cores or processors, a bus, memory controller, cache, etc. A multi-core processor may be symmetric or asymmetric.

To enable user interaction with the computing system architecture 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing system architecture 700. The communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, RAMs 716, ROM 718, and hybrids thereof.

The storage device 708 can include services 710, 712, 714 for controlling the processor 704. Other hardware or software modules are contemplated. The storage device 708 can be connected to the system connection 706. In one aspect, a hardware module that performs a particular function can include the software component stored in a computer-readable medium in connection with the necessary hardware components, such as the processor 704, connection 706, output device 724, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices.

The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
    measuring a set of payments and balances associated with one or more accounts corresponding to a customer, wherein the set of payments and balances is measured over a period of time through input data obtained from a set of data sources;
    processing the set of payments and balances through a non-parametric algorithm to obtain rates of change corresponding to the set of payments and balances, wherein the rates of change are obtained as the input data is obtained;
    integrating the rates of change into a set of vectors, wherein the set of vectors includes different values corresponding to the input data;
    processing the set of vectors through a mapping algorithm to generate a mapping of the set of vectors to a sequence of template states, wherein the mapping algorithm is trained using training data that includes a set of input vectors without any target values, and wherein the mapping algorithm generates the mapping according to a dictionary of template states generated by the mapping algorithm by identifying different clusters from the training data;
    processing the mapping of the set of vectors to the sequence of template states over the period of time to generate a time series of the sequence of template states;
    processing the time series through a classification algorithm to generate a set of features associated with the time series, wherein the classification algorithm uses a similarity measure to identify the set of features according to a proximity to the sequence of template states;
    processing the set of features through a predictive model to identify a set of predictive characteristics associated with the customer, wherein the predictive model is trained using a dataset that includes a set of known trends in different sequences of template states;
    generating an offer for a new account based on the set of predictive characteristics; and
    updating the predictive model according to feedback associated with the set of predictive characteristics and the offer.

2. The computer-implemented method of claim 1, wherein the predictive model identifies the set of predictive characteristics by comparing the sequence of template states to various historical analyses of different trends observed over the period of time.

3. The computer-implemented method of claim 1, wherein the mapping algorithm generates the mapping as a result of the set of vectors being directionally similar to the sequence of template states according to cosine similarity.

4. The computer-implemented method of claim 1, wherein the mapping algorithm generates the mapping according to a normalized Euclidean distance between the set of vectors and clusters corresponding to the sequence of template states.

5. The computer-implemented method of claim 1, wherein the set of data sources includes one or more public repositories, credit reporting agencies, billing services, and medical services.

6. The computer-implemented method of claim 1, wherein generating the set of features further includes performing data mining on the time series.

7. The computer-implemented method of claim 1, wherein a cluster from the different clusters corresponds to a particular template state, and wherein the particular template state corresponds to a stability and polarity of members of the cluster according to expected future stability.

8. A system, comprising:

one or more processors; and memory storing thereon instructions that, as a result of being executed by the one or more processors, cause the system to:

measure a set of payments and balances associated with one or more accounts corresponding to a customer, wherein the set of payments and balances is measured over a period of time through input data obtained from a set of data sources;

process the set of payments and balances through a non-parametric algorithm to obtain rates of change corresponding to the set of payments and balances, wherein the rates of change are obtained as the input data is obtained;

integrate the rates of change into a set of vectors, wherein the set of vectors includes different values corresponding to the input data;

process the set of vectors through a mapping algorithm to generate a mapping of the set of vectors to a sequence of template states, wherein the mapping algorithm is trained using training data that includes a set of input vectors without any target values, and wherein the mapping algorithm generates the mapping according to a dictionary of template states generated by the mapping algorithm by identifying different clusters from the training data;

process the mapping of the set of vectors to the sequence of template states over the period of time to generate a time series of the sequence of template states;

process the time series through a classification algorithm to generate a set of features associated with the time series, wherein the classification algorithm uses a similarity measure to identify the set of features according to a proximity to the sequence of template states;

process the set of features through a predictive model to identify a set of predictive characteristics associated with the customer, wherein the predictive model is trained using a dataset that includes a set of known trends in different sequences of template states;

generate an offer for a new account based on the set of predictive characteristics; and update the predictive model according to feedback associated with the set of predictive characteristics and the offer.

9. The system of claim 8, wherein the predictive model identifies the set of predictive characteristics by comparing the sequence of template states to various historical analyses of different trends observed over the period of time.

10. The system of claim 8, wherein the mapping algorithm generates the mapping as a result of the set of vectors being directionally similar to the sequence of template states according to cosine similarity.

11. The system of claim 8, wherein the mapping algorithm generates the mapping according to a normalized Euclidean distance between the set of vectors and clusters corresponding to the sequence of template states.

12. The system of claim 8, wherein the set of data sources includes one or more public repositories, credit reporting agencies, billing services, and medical services.

13. The system of claim 8, wherein the instructions that cause the system to generate the set of features further cause the system to perform data mining on the time series.

14. The system of claim 8, wherein a cluster from the different clusters corresponds to a particular template state, and wherein the particular template state corresponds to a stability and polarity of members of the cluster according to expected future stability.

15. A non-transitory, computer-readable storage medium storing thereon executable instructions that, as a result of being executed by one or more processors of a computer system, cause the computer system to:

measure a set of payments and balances associated with one or more accounts corresponding to a customer, wherein the set of payments and balances is measured over a period of time through input data obtained from a set of data sources;

process the set of payments and balances through a non-parametric algorithm to obtain rates of change corresponding to the set of payments and balances, wherein the rates of change are obtained as the input data is obtained;

integrate the rates of change into a set of vectors, wherein the set of vectors includes different values corresponding to the input data;

process the set of vectors through a mapping algorithm to generate a mapping of the set of vectors to a sequence of template states, wherein the mapping algorithm is trained using training data that includes a set of input vectors without any target values, and wherein the mapping algorithm generates the mapping according to a dictionary of template states generated by the mapping algorithm by identifying different clusters from the training data;

process the mapping of the set of vectors to the sequence of template states over the period of time to generate a time series of the sequence of template states;

process the time series through a classification algorithm to generate a set of features associated with the time series, wherein the classification algorithm uses a similarity measure to identify the set of features according to a proximity to the sequence of template states;

process the set of features through a predictive model to identify a set of predictive characteristics associated with the customer, wherein the predictive model is trained using a dataset that includes a set of known trends in different sequences of template states;

generate an offer for a new account based on the set of predictive characteristics; and update the predictive model according to feedback associated with the set of predictive characteristics and the offer.

16. The non-transitory, computer-readable storage medium of claim 15, wherein the predictive model identifies the set of predictive characteristics by comparing the sequence of template states to various historical analyses of different trends observed over the period of time.

17. The non-transitory, computer-readable storage medium of claim 15, the mapping algorithm generates the mapping as a result of the set of vectors being directionally similar to the sequence of template states according to cosine similarity.

18. The non-transitory, computer-readable storage medium of claim 15, wherein the mapping algorithm generates the mapping according to a normalized Euclidean distance between the set of vectors and clusters corresponding to the sequence of template states.

19. The non-transitory, computer-readable storage medium of claim 15, wherein the set of data sources includes one or more public repositories, credit reporting agencies, billing services, and medical services.

20. The non-transitory, computer-readable storage medium of claim 15, wherein the executable instructions that cause the computer system to generate the set of features further cause the computer system to perform data mining on the time series.

21. The non-transitory, computer-readable storage medium of claim 15, wherein a cluster from the different clusters corresponds to a particular template state, and wherein the particular template state corresponds to a stability and polarity of members of the cluster according to expected future stability.

\*  \*  \*  \*  \*